United States Patent
Raparthy et al.

(10) Patent No.: US 9,408,237 B1
(45) Date of Patent: Aug. 2, 2016

(54) RANDOM ACCESS PREAMBLE SELECTION

(71) Applicant: Sprint Spectrum LP, Overland Park, KS (US)

(72) Inventors: Hemanth Raparthy, Ashburn, VA (US); Pinalkumari Tailor, Ashburn, VA (US)

(73) Assignee: Sprint Spectrum L.P., Overland Park, KS (US)

( * ) Notice: Subject to any disclaimer, the term of this patent is extended or adjusted under 35 U.S.C. 154(b) by 0 days.

(21) Appl. No.: 14/658,312

(22) Filed: Mar. 16, 2015

Related U.S. Application Data

(63) Continuation of application No. 13/742,999, filed on Jan. 16, 2013, now Pat. No. 9,019,823.

(51) Int. Cl.
| | |
|---|---|
| *H04L 1/00* | (2006.01) |
| *H04L 12/26* | (2006.01) |
| *H04L 12/28* | (2006.01) |
| *H04W 74/08* | (2009.01) |
| *H04W 28/02* | (2009.01) |

(52) U.S. Cl.
CPC ...... *H04W 74/0833* (2013.01); *H04W 28/0247* (2013.01); *H04W 28/0284* (2013.01)

(58) Field of Classification Search
CPC .................................................. H04W 74/0875
See application file for complete search history.

(56) References Cited

U.S. PATENT DOCUMENTS

| | | |
|---|---|---|
| 6,697,346 B1 | 2/2004 | Halton et al. |
| 8,515,474 B2 | 8/2013 | Senarath et al. |
| 2003/0095528 A1 | 5/2003 | Halton et al. |
| 2010/0227636 A1 | 9/2010 | Kwon et al. |
| 2011/0237265 A1 | 9/2011 | Sugawara et al. |
| 2013/0080280 A1 | 3/2013 | Scipioni |
| 2013/0301541 A1* | 11/2013 | Mukherjee et al. ........... 370/329 |

FOREIGN PATENT DOCUMENTS

| | | |
|---|---|---|
| EP | 2557884 A1 | 2/2013 |
| WO | 00/32000 A1 | 6/2000 |
| WO | 2008/041916 A1 | 4/2008 |
| WO | 2009/046061 A1 | 4/2009 |

* cited by examiner

*Primary Examiner* — Maharishi Khirodhar

(57) ABSTRACT

In systems and methods of random access preamble selection, a first plurality of random access preambles and a second plurality of random access preambles are stored at an access node. A random access channel request is received from a wireless device at the access node, the random access channel request comprising an application type of an application running on the wireless device, and a network load, a priority class of the wireless device, and a mobility of the wireless device are determined. When the first plurality of random access preambles is not exhausted, the network load meets a load criteria, the priority class of the wireless device meets a priority criteria, the mobility of the wireless device meets a mobility criteria, and the application type of the application meets an application criteria a random access preamble is assigned to the wireless device from the first plurality of random access preambles.

14 Claims, 5 Drawing Sheets

RANDOM ACCESS PREAMBLE SELECTION

This patent application is a continuation of U.S. application Ser. No. 13/742,999, filed on Jan. 16, 2013.

TECHNICAL BACKGROUND

A wireless device attempting to establish communication with a wireless communication network can send a request for a communication channel to an access node. The access node typically uses a procedure to allocate wireless link resources to the requesting wireless device, such as a random access procedure, which allocates wireless link resources on a request or need basis rather than establishing dedicated wireless link resources for the wireless device. A random access procedure can be used in a variety of circumstances, such as when a wireless device initiates communication when it comes out of a lower power or idle state, when a wireless device is attempting to re-establish a lost or temporarily dropped connection, when the wireless device is handed over to a second access node, or when data is available to be transferred between the access node and the wireless device.

Overview

In operation, a first plurality of random access preambles and a second plurality of random access preambles are stored at an access node. A random access channel request is received from a wireless device at the access node, the random access channel request comprising an application type of an application running on the wireless device. A network load, a priority class of the wireless device, and a mobility of the wireless device are determined. When the first plurality of random access preambles is not exhausted, the network load meets a load criteria, the priority class of the wireless device meets a priority criteria, the mobility of the wireless device meets a mobility criteria, and the application type of the application meets an application criteria, a random access preamble is assigned to the wireless device from the first plurality of random access preambles.

DETAILED DESCRIPTION

Figure 1:
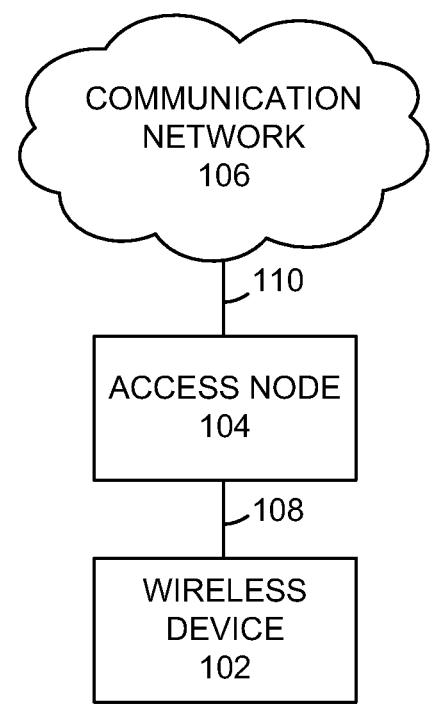
FIG. 1 illustrates an exemplary communication system for random access preamble selection.

FIG. 1 illustrates an exemplary communication system 100 for random access preamble selection comprising wireless device 102, access node 104, and communication network 106. Examples of wireless device 102 can comprise a cell phone, a smart phone, a computing platform such as a laptop, palmtop, or tablet, a personal digital assistant, or an internet access device, including combinations thereof. Wireless device 102 is in communication with access node 104 over communication link 108.

Access node 104 is a network node capable of providing wireless communications to wireless device 102, and can be, for example, a base transceiver station, a radio base station, an eNodeB device, or an enhanced eNodeB device. Access node 104 is in communication with communication network 106 over communication link 110.

Communication network 106 can be a wired and/or wireless communication network, and can comprise processing nodes, routers, gateways, and physical and/or wireless data links for carrying data among various network elements, including combinations thereof, and can include a local area network, a wide area network, and an internetwork (including the Internet). Communication network 106 can be capable of carrying voice information, for example, to support voice and data communications by a wireless device such as wireless device 102. Wireless network protocols may comprise code division multiple access (CDMA) 1×RTT, Global System for Mobile communications (GSM), Universal Mobile Telecommunications System (UMTS), High-Speed Packet Access (HSPA), Evolution Data Optimized (EV-DO), EV-DO rev. A, Third Generation Partnership Project Long Term Evolution (3GPP LTE), and Worldwide Interoperability for Microwave Access (WiMAX). Wired network protocols that may be utilized by communication network 106 comprise Ethernet, Fast Ethernet, Gigabit Ethernet, Local Talk (such as Carrier Sense Multiple Access with Collision Avoidance), Token Ring, Fiber Distributed Data Interface (FDDI), and Asynchronous Transfer Mode (ATM). Communication network 106 may also comprise additional base stations, controller nodes, telephony switches, internet routers, network gateways, computer systems, communication links, or some other type of communication equipment, and combinations thereof.

Communication links 108 and 110 can be wired or wireless communication links. Wired communication links can be, for example, twisted pair cable, coaxial cable or fiber optic cable, or combinations thereof. Wireless communication links can be a radio frequency, microwave, infrared, or other similar signal, and can use a suitable communication protocol, for example, Global System for Mobile telecommunications (GSM), Code Division Multiple Access (CDMA), Worldwide Interoperability for Microwave Access (WiMAX), or Long Term Evolution (LTE), or combinations thereof. Other wireless protocols can also be used.

Other network elements may be present in the communication system 100 to facilitate wireless communication but are omitted for clarity, such as base stations, base station controllers, gateways, mobile switching centers, dispatch application processors, and location registers such as a home location register or visitor location register. Furthermore, other network elements may be present to facilitate communication between access node 104 and communication network 106 which are omitted for clarity, including additional processing nodes, routers, gateways, and physical and/or wireless data links for carrying data among the various network elements.

In operation, a first plurality of random access preambles and a second plurality of random access preambles are stored at access node 104. A random access channel request is received from wireless device 102 at access node 104, where the random access channel request comprises an application type of an application running on wireless device 102. A network load, a priority class of wireless device 102, and a mobility of wireless device 102 are determined. When the first plurality of random access preambles a access node 104 is not exhausted, the network load meets a load criteria, the priority class of wireless device 102 meets a priority criteria, the mobility of wireless device 102 meets a mobility criteria, and the application type of the application meets an application criteria, a random access preamble is assigned to wireless device 102 from the first plurality of random access preambles. In an embodiment, a current activity of wireless device 102 can also be considered. In an embodiment, an activity history of wireless device 102 can also be considered. Further, when the first plurality random access preambles is exhausted, wireless device 102 can be assigned a random access preamble from the second plurality of random access preambles, without requiring wireless device 102 to delay the RACH process.

Figure 2:
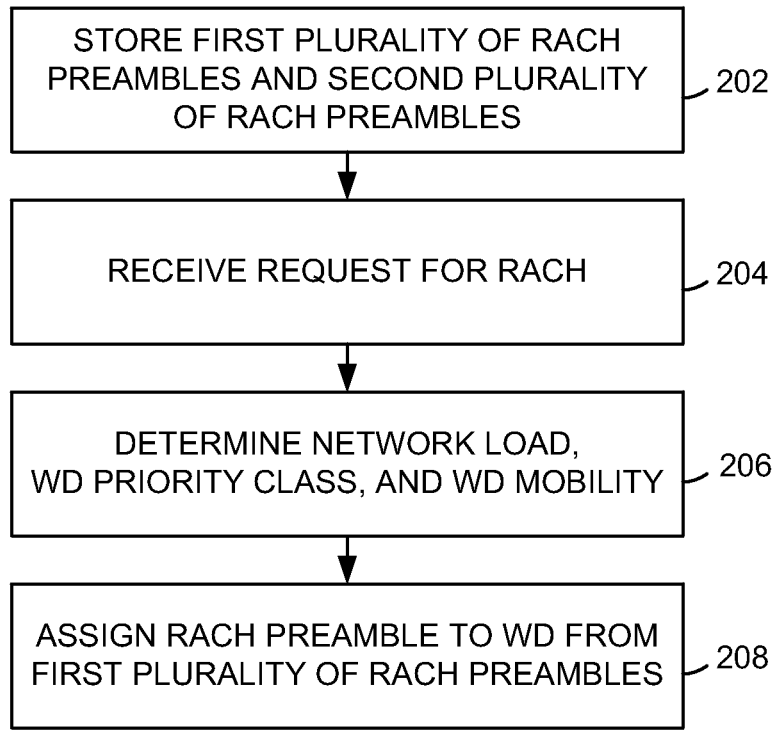
FIG. 2 illustrates an exemplary method of random access preamble selection.

FIG. 2 illustrates an exemplary method of random access preamble selection. In operation 202, a first plurality of random access channel preambles and a second plurality of random access preambles are stored. A wireless device attempting to establish communication with a wireless communication network typically sends a request for a communication channel to an access node. The access node typically uses a procedure to allocate wireless link resources to the requesting wireless device, such as a random access procedure, which allocates wireless link resources on a request or need basis rather than establishing dedicated wireless link resources for the wireless device. A random access procedure can be contention based or non-contention based. In an embodiment, the second plurality of random access preambles can be assigned to a wireless device when the first plurality of random access preambles is exhausted.

In a contention based random access procedure, a wireless device typically sends a channel request over a randomly selected random access channel (RACH). The channel request can comprise a random access preamble. When a channel request is received from the wireless device, the receiving access node can provide an indication that access is permitted, such as a positive indication in a random access response, an acquisition indication, or a similar message. After receiving the indication that access is permitted the wireless device can send a scheduled transmission of data to the access node. Following the scheduled transmission of data from the wireless device, the access node may send out a contention resolution message indicating that the transmission was successfully received. When the wireless device does not receive a success indication, the wireless device may re-initiate the contention based random access procedure. A contention based random access procedure can be used when, for example, a wireless device is handed over from one access node to another access node, when a wireless device exits an idle mode and attempts to re-establish communication with an access node, when a wireless device temporarily loses communication with an access node and attempts to re-establish communication, when data is available to be transmitted from the wireless device to the access node, or vice versa, and the like.

In a non-contention based random access procedure, an access node can assign a random access preamble to a wireless device, which the wireless device can use in a channel request which it sends to the access node. The access node can then respond to the channel request with a random access response. A non-contention based random access procedure can be used, for example, during a handover of a wireless device, or when a wireless device is notified that data is available for the wireless device, for example, by a paging procedure or similar procedure.

A random access procedure can use a group of preambles based on a first-come first-served basis, wherein a wireless device can select at random from the group of preambles. For example, when wireless device 102 initiates communication with access node 104, wireless device can receive information broadcast by access node 104 and select a random access preamble based on the received information. However, as a number of wireless devices initiating communication with access node 104 increases, the possibility of random access request collision or random access preamble collision increases, which can lead to channel requests from wireless devices being rejected and causing delay in establishing communication links with wireless devices. Greater efficiency can be achieved by using additional factors to select a random access preamble.

In operation 202, a first plurality of random access preambles and a second plurality of random access preambles is stored. For example, the first and second pluralities of random access preambles can be stored at access node 104. In an embodiment, the first plurality of random access preambles can be a dedicated group of random access preambles which is preselected for assignment to a wireless device. The availability of the first and second plurality of random access preambles can be provided by access node 104 to wireless device 102. For example, access node 104 can broadcast information, such as in a SIB message or other similar message, to provide information to wireless device 102 about random access preamble allocation.

In operation 204, a request for a RACH is received. For example, access node 104 can receive a RACH request from wireless device 102. The request for the RACH can comprise additional information from wireless device 102, such as an application running on wireless device 102. The RACH request can also comprise information such as a priority class of wireless device 102, a location and/or an indication of mobility of wireless device 102, a received power level of communication link 108, a received signal quality, and the like. A priority class of a wireless device can comprise a priority service level associated with the wireless device. For example, a wireless device intended for use by emergency response personnel, or by a premium customer, can be associated with a higher priority service level, to prioritize the assignment of wireless link resources to the wireless device. One example of such a priority service level is an allocation and retention priority. A priority class of a wireless device can also comprise a priority of certain kinds of information sent by the wireless device, such as data assigned a guaranteed bit rate, minimum throughput, maximum permitted delay, and the like. For example, data sent by a delay sensitive application running on the wireless device, such as a voice application or a streaming application (such as streaming audio or video), can be associated with a higher priority class than data sent by a non-delay sensitive application such as a web browsing application or an email application.

In operation 206, a network load, a priority class of the wireless device, and a mobility of the wireless device are determined. In an embodiment, information related to the priority class and mobility of the wireless device can be received at access node 104 in a RACH request from wireless device 102. In an embodiment, this information can be determined by access node 104, or it can be received at access node 104 from another network element of communication system 100.

In operation 208, a random access preamble is assigned to the wireless device from the first plurality of random access preambles when the first plurality of random access preambles is not exhausted, the network load meets a load criteria, the priority class of the wireless device meets a priority criteria, the mobility of the wireless device meets a mobility criteria, and the application type of the application meets an application criteria. For example, based on the received RACH request, access node 104, or another element of communication system 100, can determine that at least one random access preamble is in the first plurality of random access preambles.

Further, it can be determined that a network load meets a load criteria. For example, access node 104 can receive a threshold number of RACH requests in a period of time. As another example, a threshold number of wireless devices can be in communication with access node 104 at the time the RACH request is received from wireless device 102. As another example, an amount of data traffic sent or received by access node 104 can meet a threshold data traffic level. A network load can also comprise a backhaul congestion or utilization, which can meet a threshold level of congestion (or utilization). Other examples of a network load meeting a load criteria are also possible, including combinations of the foregoing.

It can also be determined that the priority class of the wireless device meets a priority criteria. For example, it can be determined that a priority class of wireless device 102 is meets a priority class required for access to the first plurality of random access preambles. In examples, the priority class of the wireless device can be a priority class provisioned by communication system 100, or it can be based on a type of data which is to be sent or received by wireless device 102.

It can further be determined that a mobility of the wireless device meets a mobility criteria. For example, wireless device 102 can be relatively stationary within a coverage area of access node 104. As another example, a mobility wireless device 102 can meet a threshold level of mobility within the coverage area of access node 104. The mobility of the wireless device can also be considered with a network load of access node 104. For example, when access node 104 is providing communications to a threshold level of wireless devices, or when access node 104 receives a threshold level of RACH requests in a period of time, random access preambles from the first plurality of random access preambles may be preferentially assigned to wireless devices which are relatively stationary within a coverage area of access node 104.

In addition, it can be determined that a type of application running on the wireless device meets an application criteria. For example, it can be determined that an application running on wireless device 102 is a delay sensitive application, such as a voice application or a video or audio streaming application.

Thus, when the first plurality of random access preambles is not exhausted, the network load meets a load criteria, the priority class of the wireless device meets a priority criteria, the mobility of the wireless device meets a mobility criteria, and the application type of the application meets an application criteria, a random access preamble is assigned to the wireless device from the first plurality of random access preambles.

Figure 3:
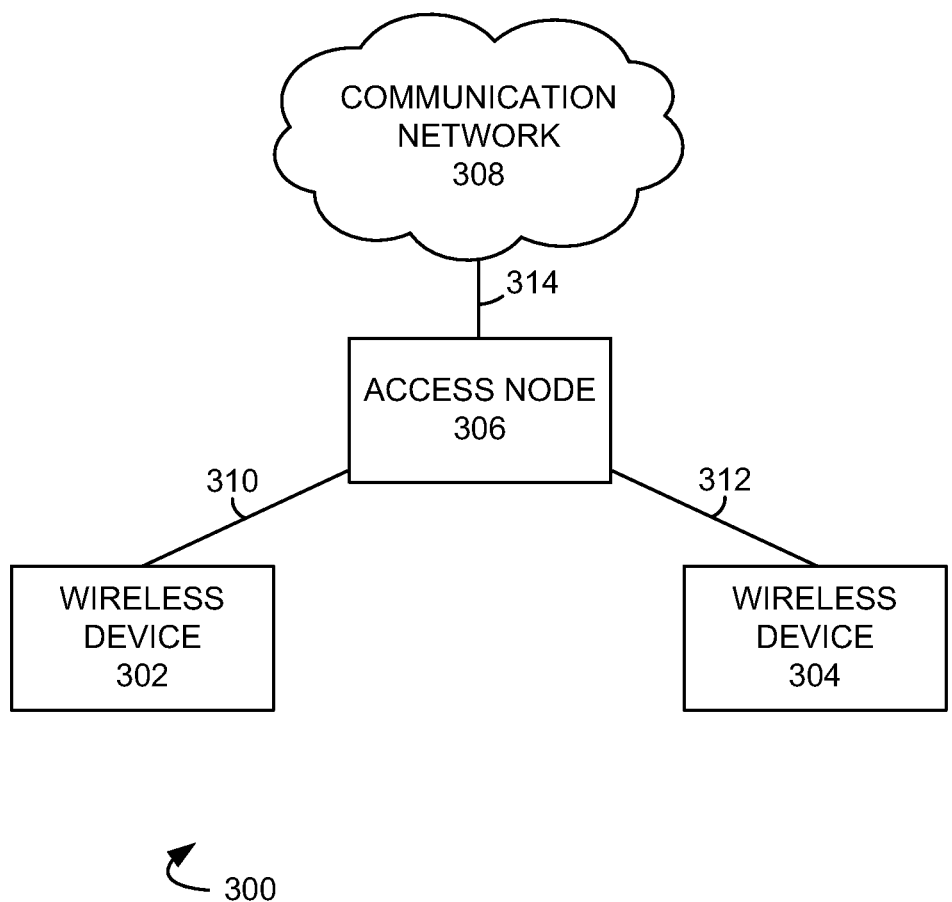
FIG. 3 illustrates another exemplary communication system for random access preamble selection.

FIG. 3 illustrates another exemplary communication system 300 for random access preamble selection comprising wireless devices 302 and 304, access node 306, and communication network 308. Examples of wireless devices 302 and 304 can comprise a cell phone, a smart phone, a computing platform such as a laptop, palmtop, or tablet, a personal digital assistant, or an internet access device, including combinations thereof. Wireless device 302 is in communication with access node 306 over communication link 310, and wireless device 304 is in communication with access node 306 over communication link 312.

Access node 306 is a network node capable of providing wireless communications to wireless devices 302 and 304, and can be, for example, a base transceiver station, a radio base station, an eNodeB device, or an enhanced eNodeB device. Access node 304 is in communication with communication network 308 over communication link 314.

Communication network 308 can be a wired and/or wireless communication network, and can comprise processing nodes, routers, gateways, and physical and/or wireless data links for carrying data among various network elements, including combinations thereof, and can include a local area network, a wide area network, and an internetwork (including the Internet). Communication network 106 can be capable of carrying voice information, for example, to support voice and data communications by a wireless device such as wireless device 302 or 304. Wireless network protocols may comprise code division multiple access (CDMA) 1xRTT, Global System for Mobile communications (GSM), Universal Mobile Telecommunications System (UMTS), High-Speed Packet Access (HSPA), Evolution Data Optimized (EV-DO), EV-DO rev. A, Third Generation Partnership Project Long Term Evolution (3GPP LTE), and Worldwide Interoperability for Microwave Access (WiMAX). Wired network protocols that may be utilized by communication network 308 comprise Ethernet, Fast Ethernet, Gigabit Ethernet, Local Talk (such as Carrier Sense Multiple Access with Collision Avoidance), Token Ring, Fiber Distributed Data Interface (FDDI), and Asynchronous Transfer Mode (ATM). Communication network 308 may also comprise additional base stations, controller nodes, telephony switches, internet routers, network gateways, computer systems, communication links, or some other type of communication equipment, and combinations thereof.

Communication links 310, 312 and 314 can be wired or wireless communication links. Wired communication links can be, for example, twisted pair cable, coaxial cable or fiber optic cable, or combinations thereof. Wireless communication links can be a radio frequency, microwave, infrared, or other similar signal, and can use a suitable communication protocol, for example, Global System for Mobile telecommunications (GSM), Code Division Multiple Access (CDMA), Worldwide Interoperability for Microwave Access (WiMAX), or Long Term Evolution (LTE), or combinations thereof. Other wireless protocols can also be used.

Other network elements may be present in the communication system 300 to facilitate wireless communication but are omitted for clarity, such as base stations, base station controllers, gateways, mobile switching centers, dispatch application processors, and location registers such as a home location register or visitor location register. Furthermore, other network elements may be present to facilitate communication between access node 306 and communication network 308 which are omitted for clarity, including additional processing nodes, routers, gateways, and physical and/or wireless data links for carrying data among the various network elements.

Figure 4:
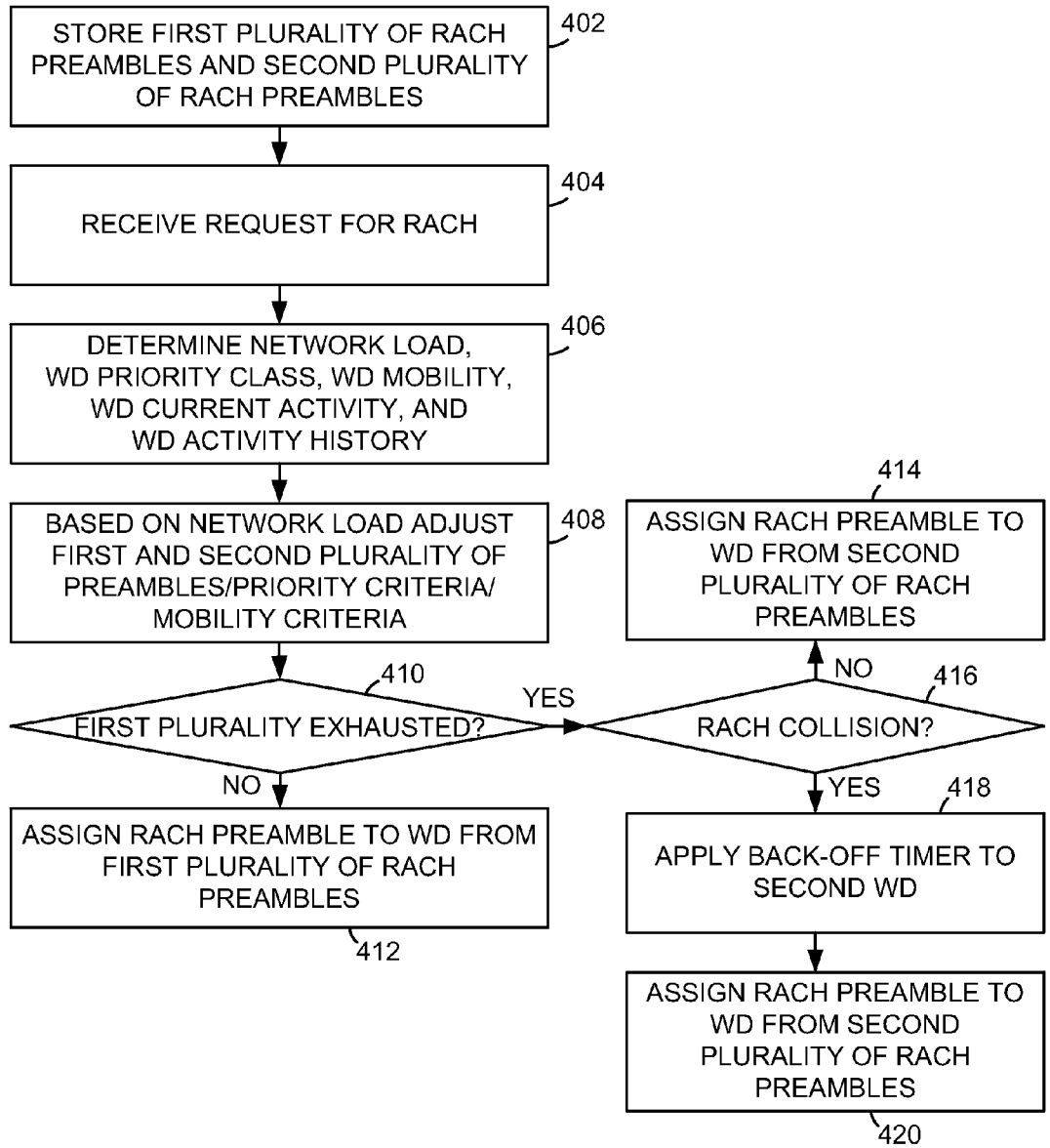
FIG. 4 illustrates another exemplary method of random access preamble selection.

FIG. 4 illustrates another exemplary method of random access preamble selection. In operation 402, a first plurality of random access preambles and a second plurality of random access preambles is stored. For example, the first and second pluralities of random access preambles can be stored at access node 306. In an embodiment, the first plurality of random access preambles can be a dedicated group of random access preambles which is preselected for assignment to a wireless device. The availability of the first and second plurality of random access preambles can be provided by access node 306 to wireless devices 302 and 304, for example, in a broadcast message, such as in a SIB message or other similar message, to provide information to wireless devices 302 and 304 about random access preamble allocation.

In operation 404, a request for a RACH is received. For example, access node 306 can receive a RACH request from wireless device 302. The request for the RACH can comprise additional information from wireless device 302, a current activity of wireless device 302, such as an application running on wireless device 302, whether wireless device 302 is running multiple applications and the application type of those applications, and whether wireless device 302 is providing network communication access for another wireless device (for example, where wireless device 302 is serving as a "mobile hotspot" or other similar function). The RACH request can also comprise an activity history of wireless device 302, such as historical information related to applications run on wireless device 302, whether wireless device 302 has run multiple applications and the application type of those applications, and whether wireless device 302 has provided network communication access for another wireless device. The activity history can also comprise an indication of whether wireless device 302 has been in a low power or idle mode, or has not been in an idle mode, for a period of time. In an embodiment, the current activity and the activity history of wireless device 302 can also be determined by access node 306 based on information from wireless device 302 and/or from another network element of communication system 300.

The RACH request can also comprise information such as a priority class of wireless device 302, a location and/or an indication of mobility of wireless device 302, a received power level of communication link 310, a received signal quality, and the like. A priority class of a wireless device can comprise a priority service level associated with the wireless device. For example, a wireless device intended for use by emergency response personnel, or by a premium customer, can be associated with a higher priority service level, to prioritize the assignment of wireless link resources to the wireless device. One example of such a priority service level is an allocation and retention priority. A priority class of a wireless device can also comprise a priority of certain kinds of information sent by the wireless device, such as data assigned a guaranteed bit rate, minimum throughput, maximum permitted delay, and the like. For example, data sent by a delay sensitive application running on the wireless device, such as a voice application or a streaming application (such as streaming audio or video), can be associated with a higher priority class than data sent by a non-delay sensitive application such as a web browsing application or an email application.

In operation 406, a network load, a priority class of the wireless device, a mobility of the wireless device, a current activity of the wireless device, and an activity history of the wireless device are determined. In an embodiment, information related to the priority class and mobility of the wireless device can be received at access node 306 in a RACH request from wireless device 302. In an embodiment, this information can be determined by access node 306, or it can be received at access node 306 from another network element of communication system 300 (such as an home subscriber server (HSS), home location register (HLR), a mobility management entity (MME), or another network element).

In operation 408, based on the determined network load the first plurality of random access preambles and the second plurality of random access preambles are adjusted based. For example, access node 306, or another network element of communication system 300, can determine that the network load meets a threshold load, and random access preambles can be added to or removed from the first plurality of random access preambles. The random access preambles can be removed from or added to the second plurality of random access preambles. In an embodiment, when a number of wireless devices with a high priority class increases (where the wireless devices are in communication with access node 306, or requesting a channel from access node 306), available random access preambles can be added to the first plurality of random access preambles from the second plurality of random access preambles. Similarly, when a number of wireless devices with a high priority class decreases, random access preambles can be removed from the first plurality of random access preambles and added to the second plurality of random access preambles. In an embodiment, a network load can comprise a number of wireless devices in communication with an access node, an amount of data in transmission and/or scheduled for transmission between the access node and wireless devices, the priority level or class of wireless devices in communication with the access node, the priority level or class of data traffic, backhaul utilization or congestion, and the like.

In addition, the priority criteria can be adjusted based on the determined network load. For example, as a network load changes, the criteria can be adjusted for determining whether a wireless device (such as wireless device 302) is associated with a sufficient priority class to be assigned a random access preamble from the first plurality of random access preambles. In an embodiment, when the network load increases, the priority criteria can be adjusted to require a higher priority class to be assigned a random access preamble from the first plurality of random access preambles.

Further, the mobility criteria can be adjusted based on the determined network load. For example, as a network load increases, the mobility criteria can be adjusted so that users associated with a threshold level of mobility are not assigned a random access preamble from the first plurality of random access preambles. Highly mobile wireless devices can be expected to remain in communication with access node 306 for less time than a less mobile or relatively stationary wireless device. Reducing the allocation of random access preambles from the first plurality of random access preambles to highly mobile wireless devices can thus more efficiently allocate communication link resources.

The adjustment of the distribution of random access preambles into the first and second pluralities of random access preambles can also be time based. For example, in a case where access node 306 were located along a commuter highway, during typical times of heavy commuting wireless devices in the coverage area of access node 306 would exhibit high mobility, and further, access node could be highly loaded during commuting times. Based on such determined conditions, the allocation of random access preambles to the first and second pluralities of random access preambles can be adjusted, for example, to assign random access preambles from the first plurality of random access preambles to fewer wireless devices, due at least in part to the high mobility of most wireless devices experienced by access node 306 during commuting times. Similarly, outside of heavy commuting times, wireless devices in the coverage area of access node 306 may not be highly mobile (for example, when wireless devices tend to be at work, or at home). In such case, the allocation of random access preambles to the first and second pluralities of random access preambles can be adjusted, for example, to assign random access preambles from the first plurality of random access preambles to a greater number of wireless devices.

In operation 410, it can be determined whether the random access preambles in the first plurality of random access preambles is exhausted. When a random access preamble remains in the first plurality of random access preambles (operation 410—NO), the wireless device is assigned a random access preamble from the first plurality of random access preambles, for example, when the network load meets a load criteria, the priority class of the wireless device meets a priority criteria, the mobility of the wireless device meets a mobility criteria, and the application type of the application meets an application criteria.

In an embodiment, the wireless device can be assigned a random access preamble from the first plurality of random access preambles when the first plurality of random access preambles is not exhausted, the network load meets a load criteria, the priority class of the wireless device meets a priority criteria, the mobility of the wireless device meets a mobility criteria, the application type of the application meets an application criteria; and the current activity of the wireless device meets a current activity criteria.

In an embodiment, the wireless device can be assigned a random access preamble from the first plurality of random access preambles when the first plurality of random access preambles is not exhausted, the network load meets a load criteria, the priority class of the wireless device meets a priority criteria, the mobility of the wireless device meets a mobility criteria, the application type of the application meets an application criteria; and the activity history of the wireless device meets an activity history criteria.

When the first plurality of random access preambles is exhausted (operation 410-YES), it can be determined whether there is a collision between the RACH request received from the wireless device and a second RACH request received from a second wireless device (operation 416). For example, wireless devices 302 and 304 can both send requests for a RACH to access node 306. A conflict between the two RACH requests is possible. When no conflict or collision occurs (operation 416-NO), a random access preamble can is assigned to the wireless device from the second plurality of random access preambles (operation 414).

When a RACH collision does occur (operation 414-YES), the second wireless device is instructed to delay re-sending a RACH request, for example, by use of a back-off timer or other delay mechanism (operation 418). In such case, the first wireless device is not instructed to delay (for example, is not instructed to use a back-off timer), and thus the first wireless device—which met the various criteria described above may re-initiate the RACH process without additional delay. In operation 420, the first wireless device can be assigned a random access preamble from the second plurality of random access preambles. For example, where RACH requests from wireless devices 302 and 304 collide or conflict, assignment of a random access preamble from the second plurality of random access preambles can be given to wireless device 302, which satisfied the various criteria to be assigned a random access preamble from the first plurality of random access preambles, over wireless device 304, when wireless device 304 does not meet one or more of the various criteria.

In an embodiment, wireless device 302 can send a RACH request to access node 306. Wireless device 302 can be, for example, in an idle mode, and can perform cell reselection of access node 306. When wireless device 302 performs cell reselection of access node 306, access node 306 can receive a request for a RACH from wireless device 302. A network load, a priority class of wireless device 302, and a mobility of wireless device 302 can be determined. In addition, a current activity and an activity history of wireless device 302 can be determined. Where, for example, it is determined that access node 306 is heavily loaded (for example, through demand for services, or by a number of wireless devices requesting or being provided services), and wireless device 302 reports that it will use a delay sensitive application, and wireless device 302 is not highly mobile, a random access preamble from the first plurality of random access preambles can be assigned to wireless device 302. In the event that the first plurality of random access preambles is exhausted, wireless device 302 may be assigned a random access preamble from the second plurality of random access preambles, without being required to delay re-initiation of the RACH process when a collision occurs with another wireless devices.

In an embodiment, wireless device 302 can be in active communication with access node 306, and can send a RACH request to access node 306. For example, wireless device 302 can exit an idle mode and attempt to establish active communication with access node 306, or wireless device 302 can be handed over to access node 306. Access node 306 can receive a request for a RACH from wireless device 302. A network load, a priority class of wireless device 302, and a mobility of wireless device 302 can be determined. In addition, a current activity and an activity history of wireless device 302 can be determined. Where, for example, it is determined that access node 306 is lightly loaded (for example, through demand for services, or by a number of wireless devices requesting or being provided services), and wireless device 302 reports that it will use a delay sensitive application, and wireless device 302 is not highly mobile, a random access preamble from the first plurality of random access preambles can be assigned to wireless device 302. In addition, access node 306 (or another network element of communication system 300) can adjust the allocation of random access preambles to the first and second pluralities of random access preambles based on, for example, the determined network load, and/or the utilization of communication link resources of access node 306.

Figure 5:
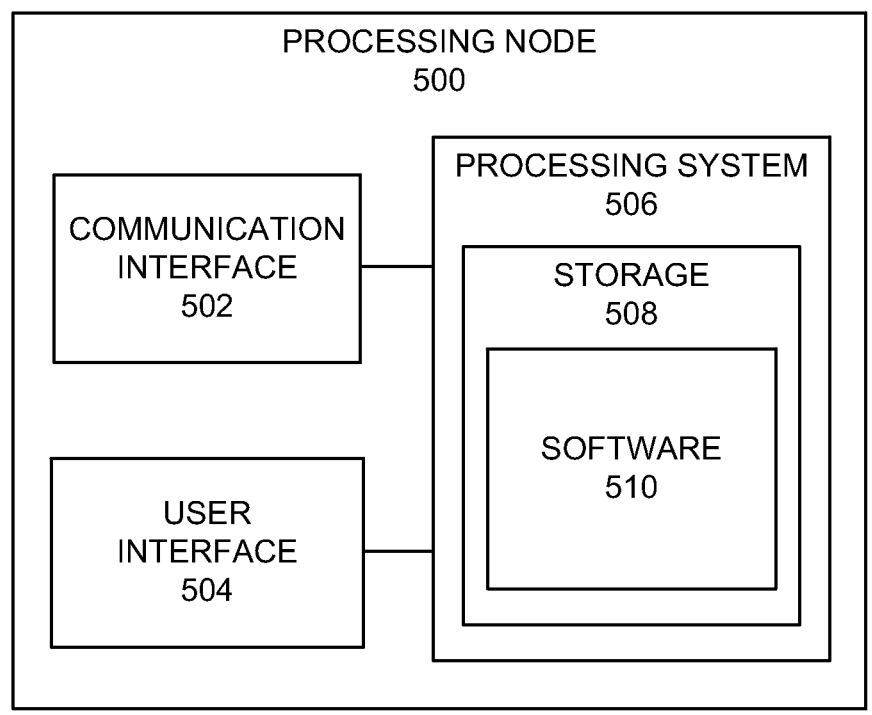
FIG. 5 illustrates an exemplary processing node.

FIG. 5 illustrates an exemplary processing node 500 in a communication system. Processing node 500 comprises communication interface 502, user interface 504, and processing system 506 in communication with communication interface 502 and user interface 504. Processing node 500 is capable of methods of random access preamble selection. Processing system 506 includes storage 508, which can comprise a disk drive, flash drive, memory circuitry, or other memory device. Storage 508 can store software 510 which is used in the operation of the processing node 500. Storage 508 may include a disk drive, flash drive, data storage circuitry, or some other memory apparatus. Software 510 may include computer programs, firmware, or some other form of machine-readable instructions, including an operating system, utilities, drivers, network interfaces, applications, or some other type of software. Processing system 506 may include a microprocessor and other circuitry to retrieve and execute software 510 from storage 508. Processing node 500 may further include other components such as a power management unit, a control interface unit, etc., which are omitted for clarity. Communication interface 502 permits processing node 500 to communicate with other network elements. User interface 504 permits the configuration and control of the operation of processing node 500.

Examples of processing node 500 include access node 104 and access node 306. Processing node 500 can also be an adjunct or component of a network element, such as an element of access node 104 or access node 306. Processing node 500 can also be another network element in a communication system.

The exemplary systems and methods described herein can be performed under the control of a processing system executing computer-readable codes embodied on a computer-readable recording medium or communication signals transmitted through a transitory medium. The computer-readable recording medium is any data storage device that can store data readable by a processing system, and includes both volatile and nonvolatile media, removable and non-removable media, and contemplates media readable by a database, a computer, and various other network devices.

Examples of the computer-readable recording medium include, but are not limited to, read-only memory (ROM), random-access memory (RAM), erasable electrically programmable ROM (EEPROM), flash memory or other memory technology, holographic media or other optical disc storage, magnetic storage including magnetic tape and magnetic disk, and solid state storage devices. The computer-readable recording medium can also be distributed over network-coupled computer systems so that the computer-readable code is stored and executed in a distributed fashion. The communication signals transmitted through a transitory medium may include, for example, modulated signals transmitted through wired or wireless transmission paths.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. A method of random access preamble selection, comprising:
    storing at an access node a first plurality of random access preambles and a second plurality of random access preambles;
    receiving a random access channel request from a wireless device at the access node, the random access channel request comprising an application type of an application running on the wireless device;
    determining a network load, a priority class of the wireless device, and a mobility of the wireless device;
    adjusting the first plurality of random access preambles and the second plurality of random access preambles based on the determined network load;
    assigning a random access preamble to the wireless device from the first plurality of random access preambles when the first plurality of random access preambles is not exhausted, the network load meets a load criteria, the priority class of the wireless device meets a priority criteria, the mobility of the wireless device meets a mobility criteria, and the application type of the application meets an application criteria;
    when the first plurality of random access preambles is exhausted, determining that a collision occurs between the random access channel request from the wireless device and a second random access channel request from a second wireless device; and
    instructing via application of a back off timer the second wireless device to delay re-sending the second random access channel request.

2. The method of claim 1, further comprising:
    determining a current activity of the wireless device; and
    assigning a random access preamble to the wireless device from the first plurality of random access preambles when the first plurality of random access preambles is not exhausted, the network load meets a load criteria, the priority class of the wireless device meets a priority criteria, the mobility of the wireless device meets a mobility criteria, the application type of the application meets an application criteria, and the current activity of the wireless device meets a current activity criteria.

3. The method of claim 1, further comprising:
    determining an activity history of the wireless device; and
    assigning a random access preamble to the wireless device from the first plurality of random access preambles when the first plurality of random access preambles is not exhausted, the network load meets a load criteria, the priority class of the wireless device meets a priority criteria, the mobility of the wireless device meets a mobility criteria, the application type of the application meets an application criteria, and the activity history of the wireless device meets an activity history criteria.

4. The method of claim 1, further comprising:
    assigning a random access preamble to the wireless device from the second plurality of random access preambles when the first plurality of random access preambles is exhausted.

5. The method of claim 4, further comprising:
    assigning a random access preamble to the wireless device from the second plurality of random access preambles.

6. The method of claim 1, further comprising:
    adjusting the priority criteria based on the determined network load.

7. The method of claim 1, further comprising:
    adjusting the mobility criteria based on the determined network load.

8. A system for random access preamble selection, comprising:
    a processing node configured to
        store at an access node a first plurality of random access preambles and a second plurality of random access preambles;
        receive a random access channel request from a wireless device at the access node, the random access channel request comprising an application type of an application running on the wireless device;
        determine a network load, a priority class of the wireless device, and a mobility of the wireless device;
        adjust the first plurality of random access preambles and the second plurality of random access preambles based on the determined network load;
        assign a random access preamble to the wireless device from the first plurality of random access preambles when the first plurality of random access preambles is not exhausted, the network load meets a load criteria, the priority class of the wireless device meets a priority criteria, the mobility of the wireless device meets a mobility criteria, and the application type of the application meets an application criteria;
        when the first plurality of random access preambles is exhausted, determine that a collision occurs between the random access channel request from the wireless device and a second random access channel request from a second wireless device; and
        apply a back off timer to the second wireless device to delay re-sending the second random access channel request.

9. The system of claim 8, wherein the processing node is further configured to:
    determine a current activity of the wireless device; and
    assign a random access preamble to the wireless device from the first plurality of random access preambles when the first plurality of random access preambles is not exhausted, the network load meets a load criteria, the priority class of the wireless device meets a priority criteria, the mobility of the wireless device meets a mobility criteria, the application type of the application meets an application criteria, and the current activity of the wireless device meets a current activity criteria.

10. The system of claim 8, wherein the processing node is further configured to:
   determine an activity history of the wireless device; and
   assign a random access preamble to the wireless device from the first plurality of random access preambles when the first plurality of random access preambles is not exhausted, the network load meets a load criteria, the priority class of the wireless device meets a priority criteria, the mobility of the wireless device meets a mobility criteria, the application type of the application meets an application criteria, and the activity history of the wireless device meets an activity history criteria.

11. The system of claim 8, wherein the processing node is further configured to:
   assign a random access preamble to the wireless device from the second plurality of random access preambles when the first plurality of random access preambles is exhausted.

12. The system of claim 11, wherein the processing node is further configured to:
   assign a random access preamble to the wireless device from the second plurality of random access preambles.

13. The system of claim 8, wherein the processing node is further configured to:
   adjust the priority criteria based on the determined network load.

14. The system of claim 8, wherein the processing node is further configured to:
   adjust the mobility criteria based on the determined network load.

* * * * *